(12) United States Patent
Karremans

(10) Patent No.: US 9,143,405 B2
(45) Date of Patent: Sep. 22, 2015

(54) METHOD AND SYSTEM FOR POLICY-BASED CONTROL IN A DISTRIBUTED NETWORK

(75) Inventor: Paulus Karremans, Tilburg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 430 days.

(21) Appl. No.: 10/533,395

(22) PCT Filed: Oct. 22, 2003

(86) PCT No.: PCT/EP03/11672
§ 371 (c)(1),
(2), (4) Date: Apr. 30, 2005

(87) PCT Pub. No.: WO2004/040843
PCT Pub. Date: May 13, 2004

(65) Prior Publication Data
US 2006/0041666 A1    Feb. 23, 2006

Related U.S. Application Data

(60) Provisional application No. 60/423,137, filed on Nov. 1, 2002.

(51) Int. Cl.
*G06F 15/173* (2006.01)
*H04L 12/24* (2006.01)
(Continued)

(52) U.S. Cl.
CPC ............ *H04L 41/0893* (2013.01); *H04L 47/20* (2013.01); *H04L 67/28* (2013.01); *H04L 67/2852* (2013.01); *H04L 12/66* (2013.01); *H04L 41/06* (2013.01)

(58) Field of Classification Search
CPC ...... H04L 12/66; H04L 41/06; H04L 41/0893
USPC ..................................... 709/223, 224
See application file for complete search history.

(56) References Cited

U.S. PATENT DOCUMENTS 6,463,470 B1 * 10/2002 Mohaban et al. ............. 709/223
6,539,427 B1 *  3/2003 Natarajan et al. ............ 709/224
(Continued)

FOREIGN PATENT DOCUMENTS

| EP | 1091526 A | 4/2001 |
|---|---|---|
| WO | WO 01/19031 A | 3/2001 |
| WO | WO 01/27644 A | 4/2001 |

OTHER PUBLICATIONS

Chan K et al "COPS Usage for Policy Provisioning (COPS-PR)" IETF Request for Comments, Mar. 1, 2001 pp. 1-34.
Durham D et al "The COPS (Common Open Policy Service) Protocol" IETF Request for Comments, Jan. 31, 2000 p. 3-6.
(Continued)

*Primary Examiner* — Jeong S Park

(57) ABSTRACT

A method and a system is disclosed for policy-based control of a communication network having a distributed architecture, including at least one heterogeneous communication network, which network elements provide for registering events, sending notifications of the occurrence of events and enforcing a policy upon said events if certain conditions are met, wherein the PEP 604 serves as a server towards a PDP 607, being a client By applying the method and system of the invention, multiple Stakeholders, having each at least one Policy Decision Point 607, can influence policy enforcements carried out at a Policy Enforcement Point 604.

17 Claims, 6 Drawing Sheets

(51) Int. Cl.
    *H04L 12/813*     (2013.01)
    *H04L 29/08*     (2006.01)
    *H04L 12/66*     (2006.01)

(56) References Cited

U.S. PATENT DOCUMENTS

| | | | | |
|---|---|---|---|---|
| 6,578,076 | B1* | 6/2003 | Putzolu | 709/223 |
| 6,584,502 | B1* | 6/2003 | Natarajan et al. | 709/224 |
| 6,611,864 | B2* | 8/2003 | Putzolu et al. | 709/223 |
| 6,973,034 | B1* | 12/2005 | Natarajan et al. | 370/232 |
| 7,213,068 | B1* | 5/2007 | Kohli et al. | 709/225 |
| 2002/0045446 | A1* | 4/2002 | Peters | 455/432 |
| 2002/0184374 | A1* | 12/2002 | Morikawa | 709/229 |
| 2003/0009444 | A1* | 1/2003 | Eidler et al. | 707/1 |
| 2004/0064558 | A1* | 4/2004 | Miyake | 709/226 |

OTHER PUBLICATIONS

Chan, et al., Network Working Group, Request for Comments: 3084, COPS Usage for Policy Provisioning, Mar. 2001.

Durham, et al., Network Working Group, Request for Comments: 2748, The COPS (Common Open Policy Service) Protocol, Jan. 2000.

Moore, et al., Network Working Group, Request for Comments: 3060, Policy Core Information Model—Version 1 Specification, Feb. 2001.

Rigney, et al., Network Working Group, Request for Comments: 2138, Remote Authentication Dial In User Service (RADIUS), Apr. 1997.

ETSI ES 201 915-13 V0.0.2; Draft, Open Service Access; Application Programming Interface; Part 13: Policy Management SCF; Feb. 2002.

Wikipedia; Diameter (protocol); Oct. 2014.

* cited by examiner

METHOD AND SYSTEM FOR POLICY-BASED CONTROL IN A DISTRIBUTED NETWORK

BACKGROUND OF THE INVENTION

1. Technical Field of the Invention

The present invention relates generally to a method for policy-based control of a communication network having a distributed architecture, including at least one heterogeneous communication.

2. Description of Related Art

In an open services market, network operators will have to provide highly secure, open, standard interfaces to their networks.

Policy-based control of a network is a recent approach to meet these requirements by distribution of functionality among network components and simplifying linking the distributed functionality to one another by employing policies. Policies are statements that dictate what policy enforcements and behaviours are permitted and on which events (hereinafter called Events) in a computer- or telecommunications network. A network administrator may define a set of policies governing the network.

According to the state of the art there are methods and systems developed for policy enforcement and policy management. Policy management and policy evaluation is e.g. currently drafted by a Parlay Policy Management Working Group of the Parlay Group, which is a multi-vendor consortium formed to enable the development of applications that operate across multiple, networking-platform environments by developing open, technology-independent application programming interfaces (APIs). The Parlay Policy Management Working Group (PPMWG) is set up to maintain and enhance the Parlay Policy Management and -Evaluation APIs that enable management of policy domains within the network which domains are firstly independent of network architectures and secondly independent of transport/application protocols. The draft of the PPMWG on policy management covers the composition of policies and the latest contributions also describe policy evaluation.

One example of policies being applied is that currently, networks may provide different services to clients by employing the aforementioned policy management methods. These networks rely on traffic handling mechanisms of the network elements that are transferring data. These elements are mostly switches, routers, proxies and protocol gateways. Such protocol gateways have for instance been defined in Parlay. Also examples of these elements are "Common Service Enablers" and "Other Service Enablers" as defined by OMA. An enabler (Enabler), in this context, is a logical entity that offers certain services. Its services may typically be invoked by means of an interface.

The traffic handling mechanisms include mechanisms that determine to which flow traffic belongs, and queuing mechanisms by which resources may be assigned to a particular flow. Network elements that support traffic handling mechanisms are also referred to as Policy Enforcement Points (PEPs) because they are able to apply policies to the traffic transferred by them.

In addition, network elements must support mechanisms by which their traffic handling functionality can be executed or configured. Typically, PEPs are associated with some form of Policy Server, also known as a Policy Decision Point (PDP). Typically, a PDP supports one or more commonly known configuration protocols, such as Common Open Policy Services (COPS), which is a protocol between a PEP and a PDP, where the PEP requests a decision from the PDP.

For top-down provisioning, a PDP may use COPS-PR to push top-down configuration information to associated PEPs. COPS-PR is an extension to COPS where the PDP contacts a PEP.

Some PEPs may include PDP functionality locally. Others may invoke the PDP functionality from a separate Policy Server. In this way PEPs and PDPs work together to apply policies, acting on policy data related to e.g. business to business configuration, privacy, security and authorisation, that are typically stored in some form of register database (hereinafter called Register).

The described state of the art specifications consider the PEP a client and the PDP a server. An example of this approach is the aforementioned COPS protocol. The Internet Engineering Task Force (IETF) is further developing COPS. COPS may be applied in a client/server model for supporting policy control over quality of service signaling protocols, but may in general be applied to any other situation with distributed control. The policy framework illustrated in the COPS specification describes the entities PEP and PDP and the mechanism for the PEP to initiate a relation establishment with a PDP. It also describes messages for the interaction between the PEP and the PDP. The model is based on the server returning decisions to policy requests, wherein the PEP sends a request to the PDP to become its client and wherein the PDP as server decides whether or not to accept the PEP client.

Other models that refer to policy management are described in e.g. the Policy Core Information Model (RFC3060), which defines in Unified Modeling Language notation, the classes that a policy may be composed of (policy, policy rule, policy rule Event, policy rule Action); and Radius (RFC2138) and Diameter, which may be used to request decisions regarding network access.

Systems according to the current art comprise a PEP sending out a decision request to a PDP when a specific Event occurs at the entity implementing the PEP. The PEP sends information about the Event or a pointer to such information to the PDP. The PDP evaluates the Events against policy and decides the appropriate policy enforcement. Subsequently the PDP returns its decision on how the PEP must act on the Event to the PEP and the PEP carries out (enforces) the decision taken by the PDP.

Other standards like Radius do not cover the establishment of the Client/Server relationship or the PEP/PDP relationship or do not cover the exchange of Event notification and policy enforcement capabilities of the PEP. Event notification Capability in this context means the capability to notify Events that are occurring, such as a request for access to the network, a request for resource usage or a request for any other service. Policy enforcement capability in this context means modification by the PEP of such service request, (partial) refusal of such service request and/or performing other policy enforcements by the PEP that can be suggested by the PDP.

The current approach by systems, policy models, framework and standards, which considers the PEP a client of the PDP server has inherent limitations, and especially lack:

Possibility for Multiple Stakeholders (hereinafter called Stakeholders) such as operators, application developers, vendors, governmental organizations, end-users or service providers, to subscribe to PEP capabilities outside their service domain; and An easy way for defining policies to be enforced by PEPs without having to first register the capabilities of the PEP.

DISCLOSURE OF THE INVENTION

In order to overcome the disadvantages of existing solutions, there is a need for methods and systems that efficiently enable stakeholders by their selves or in groups to determine their own policy enforcement upon Events and therefore fully control the PDP in their own domain.

The invention deals with this problem by providing the PEP with a server capability and turn the PDPs into clients of the PEP, being a server, in order to make more possibilities to solve the aforementioned disadvantages available.

The invention provides in a first aspect thereof a method and a system for policy-based control of a communication network having a distributed architecture, including at least one heterogeneous communication network comprising messaging between network elements, comprising at least one PEP, one or more PDPs, which network elements provide for registering events, sending notifications of the occurrence of events and enforcing a policy upon said events if certain conditions are met, wherein the at least one PEP serves as a server towards at least one PDP, being a client.

In a second aspect of the invention, the PEP where the Events are occurring are being kept outside the Stakeholder's domain and therefore outside the domain where the PDP is located, which could be a third party domain.

In a third aspect of the invention, the Stakeholder registers its own PDP to the PEP to be able to suggest its decision to the PEP domain.

The invention furthermore provides for the PEP to report to registered PDPs, specific Events that are of third party interest. The PDP initiates a registration procedure to the PEP. This PDP may be a third party PDP but is not restricted to third party PDPs only. In this procedure the PDP specifies the Events that the PDP is interested in. The PEP registers a reference (hereinafter called Reference) related to the PEP service that can be used by a PDP to contact the PEP. In a later stage when PDP wishes to receive notifications of Events at the PEP, the PDP sends a Reference to the PEP in a request for notification. The PEP sends its notifications to these References.

If such an Event occurs at the PEP, it notifies the PDPs that subscribed to that Event on the registered Reference, after which the PEP awaits the decision of the PDP.

Multiple PDPs may subscribe to the same Event. If multiple PDPs have subscribed to an Event, then the PEP notifies the PDPs one at the time, according to a certain priority scheme. If multiple suggested Decisions of multiple PDPs are received by the PEP, the PEP may carry out a policy enforcement or multiple consecutive Actions according to a certain priority scheme.

New aspects of this Invention are:
The concept of the PEP acting as a server, providing a PEP service.
The concept of a PDP acting as a client of the PEP.
The message to a Register, which may originate directly from a PEP, to register the Event notification capabilities and the enforcement capabilities of the PEP Service.
A message from a PDP to a PEP to request to be notified when certain Events happen.
The message from PEP to PDP that reports to the PDP that an Event has occurred or a set of Events has occurred, containing a Reference to all the relevant Event data.
The message from PDP to PEP that indicates which Event related data must be retrieved from the PEP.
The message from PDP to PEP that indicates the Action to be taken by the PDP and to be enforced by the PEP.

The Invention may preferably be applied in the area of Web Services, Open Services Access (OSA), Single Sign On for multiple vendors, or any other application with distributed functionality, as these standards and standardization bodies include in their scope the service consumer and the service provider.

BRIEF DESCRIPTION OF THE DRAWINGS

In the following section, the Invention will be described by way of examples of its embodiments with reference to the attached drawing, in which.

DETAILED DECRIPTION OF THE ILLUSTRATIVE EMBODIMENTS

The innovative teachings of the present Invention will be described with particular reference to the presently preferred exemplary embodiments. However, it should be understood that this class of embodiments provides only a few examples of the many uses of the innovative teachings herein. In general, statements made in the specification of the present Invention do not necessarily delimit any of the claimed Invention.

Figure 1:
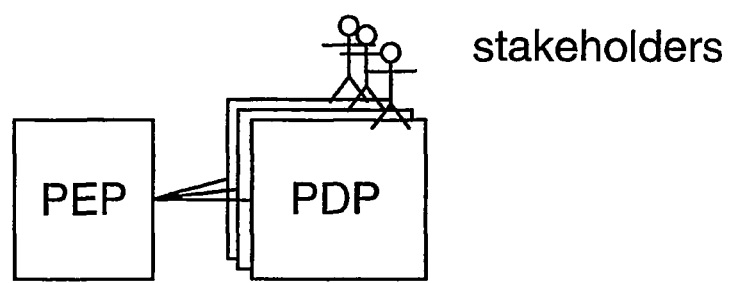
FIG. 1 shows the prior art solution with a basic overview of Stakeholders and their representation via their own PDPs.

With reference to FIG. 1 of the drawings, a general overview, according to the current art, is showing the relationship between PEP, PDP and Stakeholders, wherein the Stakeholders are represented via their own PDPs. The current approach by systems, policy models, framework and standards, which considers the PEP a client and the PDP a server has disadvantages such as a lack of possibility for Stakeholders to subscribe to PEP capabilities outside their service domain. Furthermore there is no easy way for defining policies to be enforced by PEPs without having to first register the capabilities of the PEP.

Figure 2:
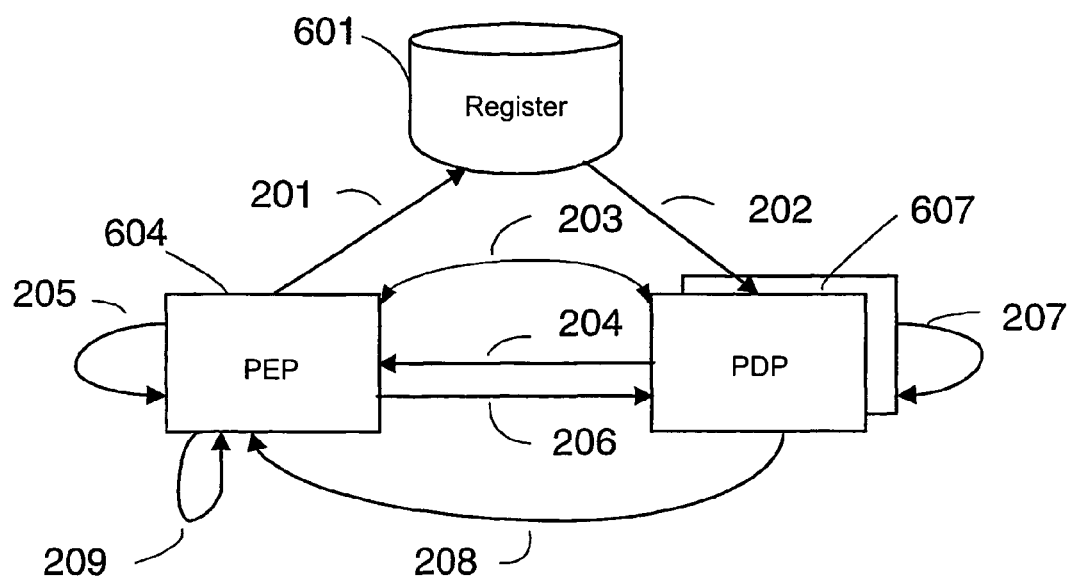
FIG. 2 shows a sequence diagram of the preferred embodiment of the invention.

FIG. 2 shows one embodiment of the invention, which represents the invented method for policy-based control of a communication network having a distributed architecture, including at least one heterogeneous communication network comprising messaging between network elements, comprising at least one PEP, one or more PDPs, which network elements provide for registering events, sending notifications of the occurrence of events and enforcing a policy upon said events if certain conditions are met, wherein the at least one PEP serves as a server towards at least one PDP, being a client. The figure shows next steps:

201: register Events that PDPs 607, being clients, can subscribe to and register Policy enforcements that PDPs 607 can suggest to the PEP 604, being a server;
202: PDPs 607 obtain the capabilities of Event notification and policy enforcement to be carried out by PEP 604;
203: establish service agreement;
204: request notification of specified Events and request possibility to return policy enforcements;
205: an Event occurs;
206: notify that an Event has occurred;
207: evaluate Event and determine policy enforcement;
208: suggest policy enforcement;
209: enforce policy These steps are explained in more detail in the following. The PEP 604 announces 201 its capabilities for Event Notification Capabilities at the Register 601 and its policy enforcements at the Register 601. The Events and policy enforcements are typical to an instance of a PEP 604. The Events represent actual Events that may occur at the PEP 604, and the policy enforcements represent actual policy enforcements that may be carried out by the PEP 604. The PDP 607 may access the Register 601 by means of the PEP Reference to investigate the PEP 604's Events, that may be notified 202 to the PDP 607 and policy enforcements that the PDP 607 may suggest. The PDP 607 and the PEP 604 establish 203 a service agreement, part of this is determining which (subset of) the registered PEP service Events and policy enforcements may be requested by the PDP 607. The PDP 607 may request to be notified of specified Events. The PDP 607 subscribes 204 to specific PEP 604 Events. Whenever such an Event occurs 205 at the PEP 604 it notifies 206 the PDPs 607 that have subscribed to this Event. Typically the PEP 604 would notify the PDPs 607 one by one. The PDPs 607 evaluate and decide 207 for the appropriate policy enforcement upon reception of the Event notification and return 208 their suggestion for the policy enforcements to be taken back to the PEP 604. Subsequently, the PEP 604 determines 209 which of these policy enforcements to carry out and carries them out.

In case of multiple PDPs having registered to the same event, a preference- or priority scheme is applied by the PEP for sending the notifications to one or more of said multiple PDPs.

In case of a PEP receiving from multiple PDPs, multiple suggestions to enforce a policy, a preference- or priority scheme is applied by said PEP for selecting such a suggestion to enforce a policy upon.

Figure 3:
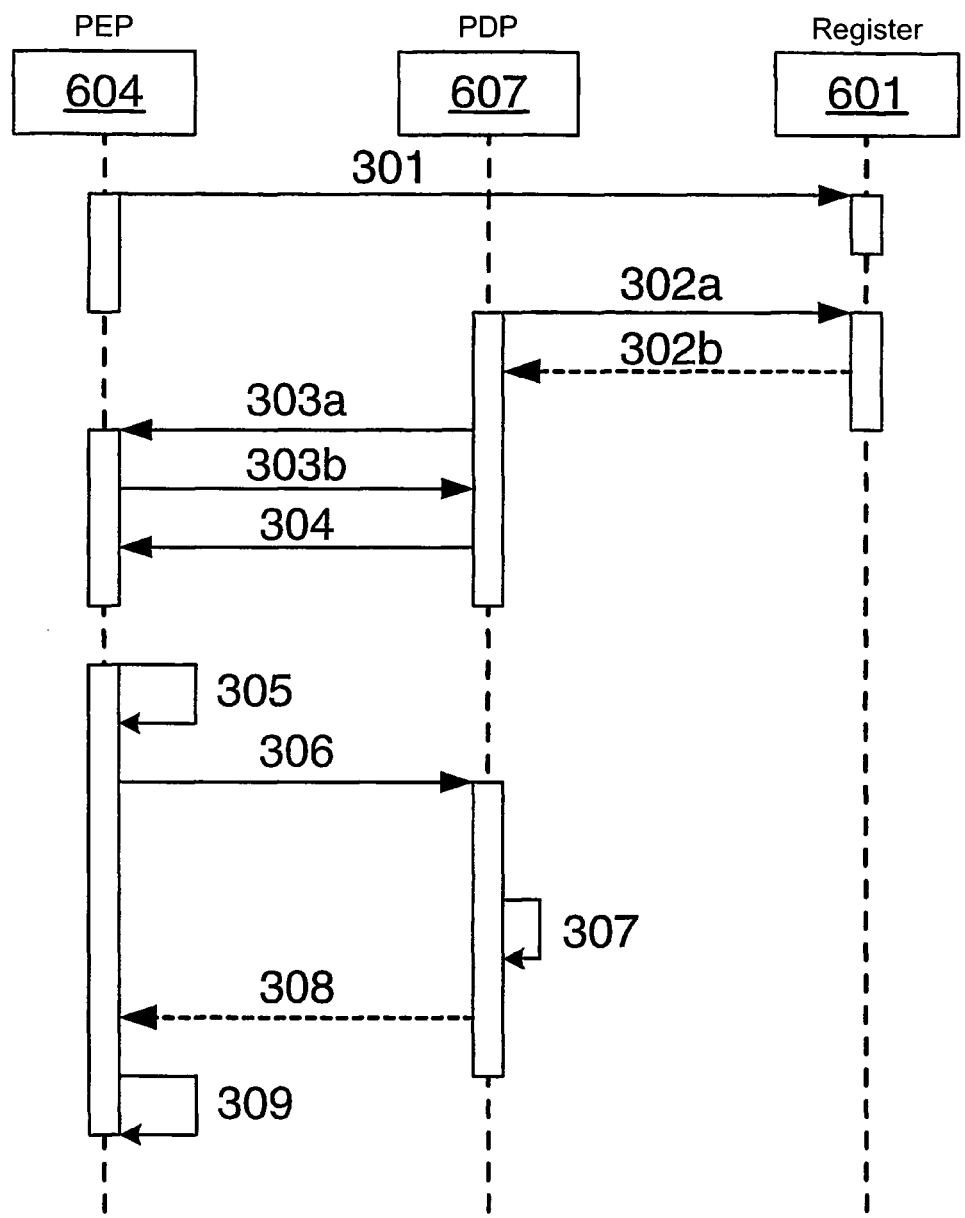
FIG. 3 shows a first method of registration of a policy to synchronous messaging.
Figure 4:
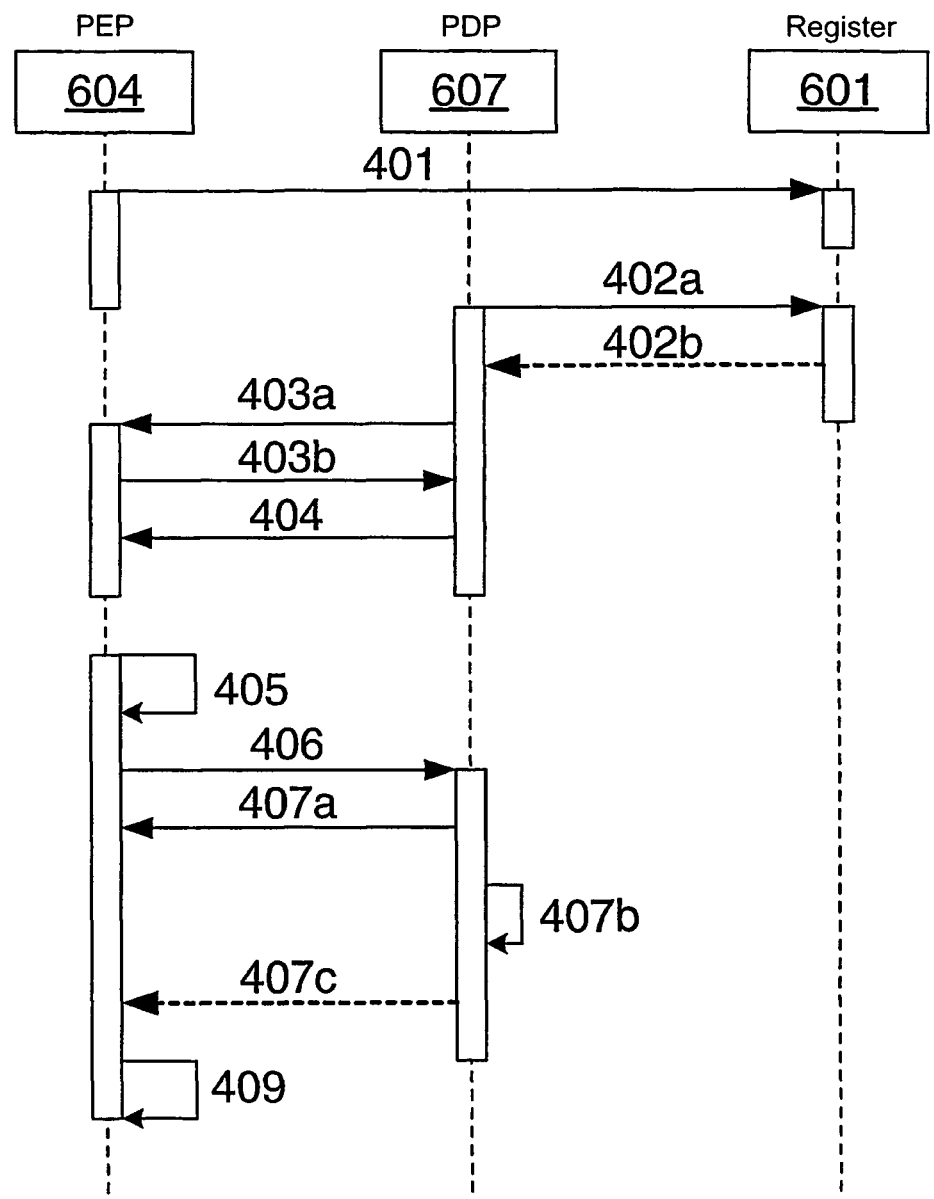
FIG. 4 shows a second method of registration of a policy to asynchronously carrying out of a policy enforcement.

FIGS. 3 and 4 describe preferred embodiments for the method of providing the PDP with specific Events related data.

FIG. 3 shows a first method, in the format of Unified Modeling Language, of a communication between a PEP 604, being a server, a PDP 607, being a client and a Register 601, in which next steps are shown:

301: register (PEP events, PEP PolicyEnforcements);
302a: find( );
302b: reference to PEP service( );
303a: establishServiceAgreement( );
303b: establishServiceAgreement( );
304: requestEventNotification(events);
305: EventOccurrance( );
306: EventNotification(eventRelatedData);
307: EvaluateEvent(eventRelatedData);
308: result(PolicyEnforcement);
309: CarryoutPolicyEnforcement(PolicyEnforcement).

The method is carried out by means of serialization of all the Event related data and shows an Event occurrence 305 at the PEP 604, as an Event that may be subscribed to by the PDP 607. The data describing the Event is gathered and sent in a message (event notification 306 to the PDP 607. In this option a message comprises:

The message from PEP 604 to PDP 607 reporting to the PDP 607 that an Event has occurred or a set of Events has occurred, where this message 306 contains all of the relevant Event data.

Its return message 308 to the PEP 604 that contains the policy enforcement to be enforced.

In the service agreement establishment 303 it is agreed which Events the specific PDP 607 may be notified of and which policy enforcements may be proposed by the PDP 607 to the PEP 604.

The Events of which a notification is requested at 304 may be a subset of the Events agreed upon in 303. The notification request 304 may also contain a callback Reference to the PDP 607. The callback Reference of the PDP 607 may also be exchanged when establishing the service agreement 303.

The notification of the Event in this embodiment is done by submitting to the PDP 607 all Event related data in the notification message 306. The PDP 607 evaluates at 307 this data and determines a policy enforcement that must be carried out by the PEP 604. The notification result message 308 carries the policy enforcement.

FIG. 4 shows a second embodiment of the method, in the format of Unified Modeling Language, of a communication between a PEP 604, being a server, a PDP 607, being a client and a Register 601, in which next steps are shown:

401: register(PEP events, PEP PolicyEnforcements);
402a: find( );
402b: reference to PEP service( );
403a: establishServiceAgreement( );
403b: establishServiceAgreement( );
404: requestEventNotification(events);
405: EventOccurrance( );
406: EventNotification(reference to eventRelatedData);
407a: getEventData(reference to eventRelatedData);
407b: EvaluateEvent(eventRelatedData);
407c: setPolicyEnforcementData(reference to eventRelatedData);
409: CarryOutPolicyEnforcement(PolicyEnforcement).

This method is carried out by means of asynchronous messaging, wherein the PDP 607 gets the Event related data upon request.

Typical for this embodiment is that the notification of the Event in this method is done by putting a Reference 406 to the Event related data in the notification message. The PDP 607 obtains 407a through this Reference the Event data that it is going to evaluate. The PDP 607 evaluates 407b this data and determines a policy enforcement that must be carried out by the PEP 604. A separate asynchronous message 407c is sent by the PDP 607 to let the PEP 604 know, which suggested policy enforcement should be enforced by the PEP 604.

The Events and policy enforcements that the PEP 604 registers at the Register 601 may be considered capabilities of a PEP service. The service may therefore be implemented as a web service. The Register 601 may be implemented as a Discovery web service.

Figure 5:
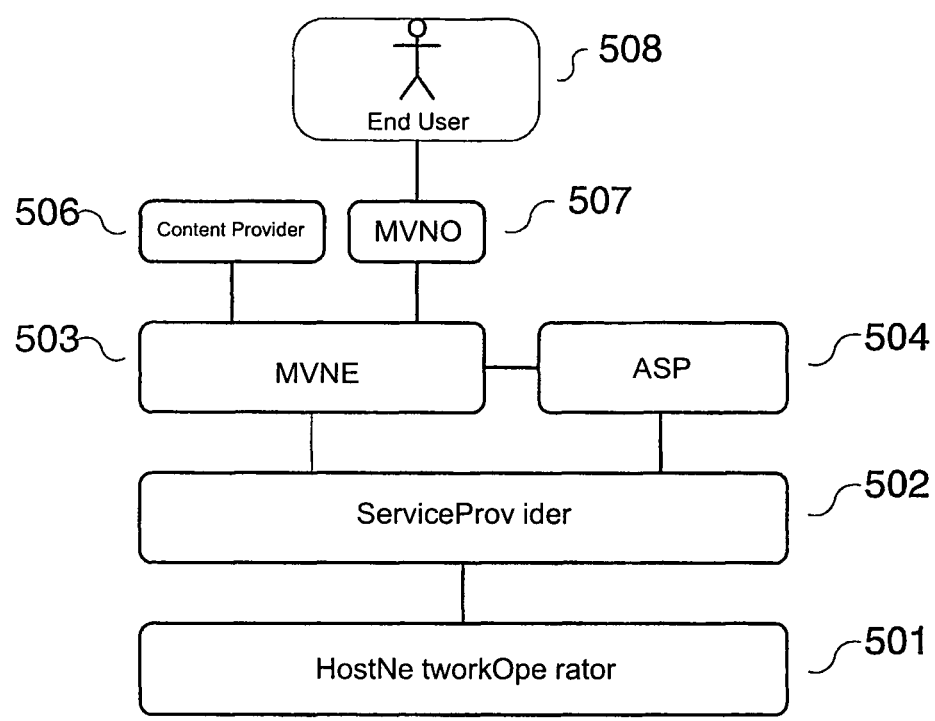
FIG. 5 shows an embodiment wherein the service domains are involved in the Open Mobile Alliance (OMA).

FIG. 5 shows the service domains that are involved, as to show that the Invention may be applied in possibly any other field that involves multiple Stakeholders that are interested in or would like to influence an atomic Event and who are willing to determine a policy enforcement upon that Event. The lines that connect the various elements show possible service agreements (Relations). In the showed example next parties are involved:

A host network operator 501 hosting a service provider (SP) 502. An SP 502 providing services to a mobile virtual network enabler (MVNE) 503 and having a Relation with an application service provider (ASP) 504. A Content Provider 506 providing content data to a MVNE 503, which passes the content data to a mobile virtual network operator (MVNO) 507. An ASP 504 providing application services to an MVNE 503 and an SP 502. And finally, a MVNO 507 having a Relation with an End-User 508.

An example of a field involving multiple Stakeholders is defined in the upcoming OMA. OMA is a standards body that provides specifications to make the mobile Internet work by means of a standardized architecture and open APIs that enable interoperability. OMA addresses the generation of a layered service model with multiple service domains involved.

In this case a PEP would typically be located in an Enabler in the Service Provider (SP) domain. The other service domains are interested in the Events occurring in the Mobile Virtual Network Enabler (MVNE), such as a specific method being called with a specific set of parameters on the MVNE.

Each of these service domains could have in place its own PDP to be able to influence the decision to be carried out at the PEP/MVNE. E.g. the Mobile Virtual Network Operator (MVNO) domain PDP represents the end-user when end-user specific settings must be evaluated, when a service is requested from the SP domain, which has the PEP.

Other examples of implementation of the Invention relate to e.g. governmental domains with PDPs that are involved in for example lawful interception legislations.

The present Invention provides several (additional) advantages with regard to existing solutions such as the:
- The invention provides possibilities to dynamically associate additional functionality, which may also comprise other functionalities than PDP, as long as these functionalities interface in a similar way as a PDP.
- Interoperability: One PEP Server is able to link-up with multiple PDP clients without obstructions caused by differences in manufacturer's software and hardware.
- Multiple Stakeholders have their say and may suggest policy enforcements to be enforced by the PEP.

Figure 6:
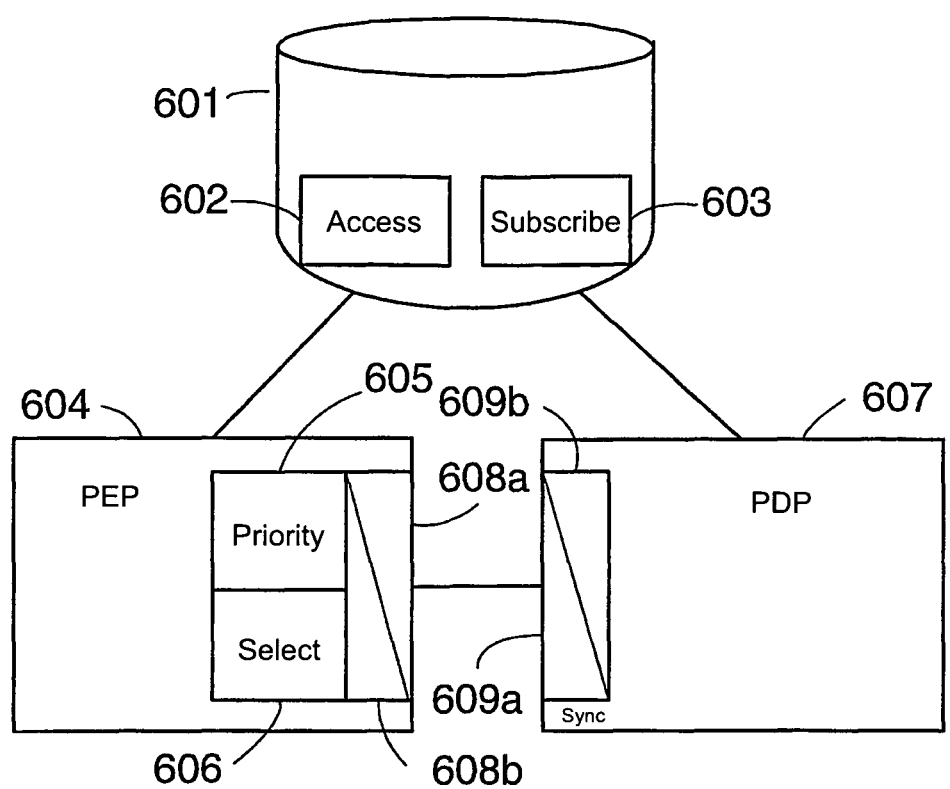
FIG. 6 shows an overview of the preferred embodiment of the system with the means that are part of the invention.

FIG. 6 Shows an embodiment of a system for policy-based control of a communication network having a distributed architecture, including at least one heterogeneous communication network comprising messaging between network elements, comprising at least one PEP 604, one or more PDPs 607, which network elements provide for registering events, sending notifications of the occurrence of events and enforcing a policy upon said events if certain conditions are met, wherein the at least one PEP 604 is arranged as a server towards at least one PDP 607, being a client.

The system furthermore comprises next means:
- access means 602 for making the policies of a PEP 604 available to the one or more PDPs 607;
- subscribing means 603 for the one or more PDPs 607 to subscribe to one or more PEP 604 policy enforcement capabilities outside the domain of a PDP 607;
- prioritizing means 605 for applying a preference- or priority scheme by the PEP 604 for sending the notifications to one or more of the multiple PDPs 607, in case of multiple PDPs 607 having registered to the same event;
- selecting means 606 for applying a preference- or priority scheme by the PEP 604 for selecting a suggestion to enforce a policy upon, in case of a PEP 604 receiving multiple suggestions to enforce a policy from multiple PDPs 607;
- Messaging means which comprise either:
  - synchronous messaging means 608a and 609a to enable, after the occurrence of the event, synchronous messaging, wherein event data are sent together with the notifications from the PEP 604 to the PDP 607; or
  - asynchronous messaging means 608b and 609b to enable, after occurrence of the event, asynchronous messaging, wherein event data are sent from the PEP 604 to the PDP 607 after a request by the PDP for sending said event data;
- a register 601 arranged for:
  - a PEP 604 to register events that a PDP 607 can subscribe to;
  - the PEP 604 to register policy enforcements that the PDP 607 may suggest to the PEP 604;
  - the PDP 607 to obtain the registered events;
  - the PDP 607 to obtain the registered policy enforcements.

PDPs 607 may comprise stakeholders such as operators, application developers, vendors, governmental organizations, end-users or service providers.

Although preferred embodiments of the system, method, and apparatus of the present Invention have been illustrated in the accompanying Drawings and described in the foregoing Detailed Description, it is recognized by those skilled in the art, that the Invention is not limited to the embodiments disclosed, but is capable of numerous rearrangements, modifications, and substitutions without departing from the spirit of the Invention as set forth and defined by the following claims.

What is claimed is:

1. A method for policy-based control of a communication network having a distributed architecture, including at least one heterogeneous communication network, the method comprising:
   messaging between network elements, said network elements comprising at least one policy enforcement point (PEP) and one or more policy decision points (PDPs), said messaging including:
   the at least one PEP announcing event notification capability information of the at least one PEP to make the event notification capability information available to the one or more PDPs, and
   subscribing the one or more PDPs to at least one event notification capability of the at least one PEP;
   sending notifications of the occurrence of events subscribed to by the one or more PDPs; and
   the at least one PEP enforcing a policy upon said events if certain conditions are met,
   wherein, in case of the at least one PEP receiving from multiple ones of the one or more PDPs multiple suggestions to enforce said policy, a preference-or priority scheme is applied by said at least one PEP for selecting one of the suggestions to enforce said policy upon.

2. The method for policy-based control of a communication network according to claim 1 wherein the policy enforcement capabilities of the at least one PEP are made available to the one or more PDPs.

3. The method for policy-based control of a communication network according to claim 1 wherein the one or more PDPs subscribe to one or more PEP policy enforcement capabilities outside the service domain of the one or more PDPs.

4. The method for policy-based control of a communication network according to claim 1 wherein, after the occurrence of the event, said messaging between the at least one PEP and at least one of the one or more PDPs is synchronous, wherein event data are sent together with the notifications from the at least one PEP to the at least one PDP.

5. The method for policy-based control of a communication network according to claim 1 wherein, after occurrence of the event, said messaging between the at least one PEP and at least one of the one or more PDPs is asynchronous, wherein event data are sent from the at least one PEP to the at least one PDP after a request by the at least one PDP for sending said event data.

6. The method for policy-based control of a communication network according to claim 1 wherein the method comprises the steps of:

the at least one PEP registering policy enforcements that the one or more PDPs may suggest to the at least one PEP; and the one or more PDPs obtaining said registered policy enforcements.

7. The method for policy-based control of a communication network according claim 6, wherein the method further comprises the steps of:

at least one of the one or more PDPs requesting the at least one PEP to be notified of a specified event;

the at least one PDP requesting the at least one PEP for a possibility to enforce a policy;

the at least one PEP notifying the at least one PDP that the specified event has occurred;

the at least one PDP suggesting to said at least one PEP a policy enforcement appropriate for said specified event; and the at least one PEP enforcing said policy with the suggested policy enforcement.

8. The method for policy-based control of a communication network according to claim 1 where, in case of multiple PDPs having registered to the same event, a preference-or priority scheme is applied by the at least one PEP for sending the notifications to the one or more PDPs.

9. The method for policy-based control of a communication network according to claim 1 wherein the event notification capability information includes information about a capability the at least one PEP has to notify one or more PDPs of an event comprising one of: a request for access to the communication network or a request for resource usage.

10. A system for policy-based control of a communication network having a distributed architecture, including at least one heterogeneous communication network comprising:

a plurality of network elements comprising at least one policy enforcement point (PEP), and one or more policy decision points (PDPs), said at least one PEP being configured to announce event notification capability information of the at least one PEP from the at least one PEP to make the event notification capability information available to the one or more PDPs, said one or more PDPs being configured to subscribe to at least one event notification capability of the at least one PEP, and said at least one PEP being further configured to:

send notifications of the occurrence of events subscribed to by the one or more PDPs from the at least one PEP; and enforce a policy upon said events if certain conditions are met wherein, in case of the at least one PEP receiving multiple suggestions from multiple ones of the one or more PDPs, the at least one PEP is further configured to apply a preference-or priority scheme for selecting one of the suggestions to enforce said policy upon.

11. The system for policy-based control of a communication network according to claim 10 wherein the at least one PEP is further configured to make policy enforcement capability information of the at least one PEP available to the one or more PDPs.

12. The system for policy-based control of a communication network according to claim 10 wherein the one or more PDPs are further configured to subscribe to one or more PEP policy enforcement capabilities outside the service domain of the one or more PDPs.

13. The system for policy-based control of a communication network according to claim 10 where, in case of multiple PDPs having registered to the same event, the at least one PEP is further configured to apply a preference-or priority scheme for sending the notifications to the one or more PDPs.

14. The system for policy-based control of a communication network according to claim 10 wherein the at least one PEP is further configured to send, after the occurrence of the event, event data together with the notifications to at least one of the one or more PDPs.

15. The system for policy-based control of a communication network according to claim 10 wherein the at least one PEP is further configured to send, after occurrence of the event, event data to at least one of the one or more PDPs after a request by the at least one PDP for sending said event data.

16. The system for policy-based control of a communication network according to claim 10 having a register arranged for:

the at least one PEP to register policy enforcements that the one or more PDPs may suggest to the at least one PEP;

the one or more PDPs to obtain said registered policy enforcements.

17. The system for policy-based control of a communication network according to claim 10 wherein each of the one or more PDPs corresponds to a stakeholder, the stakeholders comprising one or more of:

operators, application developers, vendors, governmental organizations, end-users or service providers.

* * * * *

UNITED STATES PATENT AND TRADEMARK OFFICE
CERTIFICATE OF CORRECTION

PATENT NO. : 9,143,405 B2
APPLICATION NO. : 10/533395
DATED : September 22, 2015
INVENTOR(S) : Karremans Page 1 of 1

It is certified that error appears in the above-identified patent and that said Letters Patent is hereby corrected as shown below:

On the Title Page, in Item (57), under "ABSTRACT", in Column 2, Line 8, delete "client" and insert -- client. --, therefor.

In The Drawings

In Fig. 5, Sheet 5 of 6, for Tag "508", in Line 1, delete "End User" and insert -- End-User --, therefor.

In Fig. 5, Sheet 5 of 6, for Tag "502", in Line 1, delete "ServiceProv ider" and insert -- Service Provider --, therefor.

In Fig. 5, Sheet 5 of 6, for Tag "501", in Line 1, delete "HostNe tworkOpe rator" and insert -- Host Network Operator --, therefor.

In The Specification

In column 4, Line 23, delete "DECRIPTION" and insert -- DESCRIPTION --, therefor.

In Column 4, Line 67, delete "policy" and insert -- policy. --, therefor.

In Column 5, Line 56, delete "(event" and insert -- event --, therefor.

In Column 6, Line 54, delete "involved:" and insert -- involved. --, therefor.

In Column 7, Line 30, delete "Shows" and insert -- shows --, therefor.

In The Claims

In Column 9, Line 7, in Claim 7, delete "according" and insert -- according to --, therefor.

In Column 10, Line 2, in Claim 10, delete "met" and insert -- met, --, therefor.

Signed and Sealed this
Eighth Day of March, 2016

Michelle K. Lee
*Director of the United States Patent and Trademark Office*